US012589389B2

(12) United States Patent
Patt et al.

(10) Patent No.: US 12,589,389 B2
(45) Date of Patent: Mar. 31, 2026

(54) RANDOM ACCESS AUTOMATED MOLECULAR TESTING SYSTEM

(71) Applicant: Siemens Healthcare Diagnostics Inc., Tarrytown, NY (US)

(72) Inventors: Paul Patt, Walnut Creek, CA (US); Roy Barr, Delaware, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/759,957

(22) PCT Filed: Mar. 15, 2021

(86) PCT No.: PCT/US2021/070272
§ 371 (c)(1),
(2) Date: Aug. 2, 2022

(87) PCT Pub. No.: WO2021/195653
PCT Pub. Date: Sep. 30, 2021

(65) Prior Publication Data

US 2023/0123901 A1 Apr. 20, 2023

Related U.S. Application Data

(60) Provisional application No. 62/994,924, filed on Mar. 26, 2020.

(51) Int. Cl.
*B01L 3/00* (2006.01)
*B01L 7/00* (2006.01)

(52) U.S. Cl.
CPC ............... *B01L 3/5027* (2013.01); *B01L 7/52* (2013.01); *B01L 2200/026* (2013.01);
(Continued)

(58) Field of Classification Search
CPC .... B01L 3/5027; B01L 7/52; B01L 2200/026; B01L 2200/028; B01L 2200/0689;
(Continued)

(56) References Cited

U.S. PATENT DOCUMENTS

2004/0037739 A1 2/2004 McNeely et al.
2005/0186585 A1* 8/2005 Juncosa .................. B01L 7/525
435/287.2

(Continued)

FOREIGN PATENT DOCUMENTS

CN 106929408 7/2017
CN 108359600 8/2018

OTHER PUBLICATIONS

International Search Report for PCT/US2021/070272 dated Jul. 28, 2021.

*Primary Examiner* — Robert J Eom

(57) ABSTRACT

A random access automated molecular testing system and method is used with a planar polymerase chain reaction (PCR) chip to provide molecular detection covering a wide variety of assays/tests in a small footprint. An automated transport mechanism moves the PCR chip between a pipette loading station, a sealing station and an amplification and detection module to provide batchless and random-access amplification and detection of a biological sample fluid. The PCR chip a planar rectangular body, a U-shaped channel for receiving sample fluid from an inlet port and a gripping feature laterally extending from an upper surface of the body above the inlet port for use by the automated transport mechanism. An amplification and detection module includes a heating block, a clip with a viewing window for retaining the PCR chip and a detection platform for identifying a content characteristic of interest of the sample fluid.

15 Claims, 10 Drawing Sheets

(52) U.S. Cl.
CPC . *B01L 2200/028* (2013.01); *B01L 2200/0689* (2013.01); *B01L 2200/147* (2013.01); *B01L 2300/0609* (2013.01); *B01L 2300/0645* (2013.01); *B01L 2300/0816* (2013.01); *B01L 2300/1822* (2013.01)

(58) Field of Classification Search
CPC ....... B01L 2200/147; B01L 2300/0609; B01L 2300/0645; B01L 2300/0816; B01L 2300/1822
See application file for complete search history.

(56) References Cited

U.S. PATENT DOCUMENTS

| | | | |
|---|---|---|---|
| 2008/0182301 | A1 | 7/2008 | Handique et al. |
| 2010/0323405 | A1* | 12/2010 | Pollack ................ C12Q 1/6846 435/91.5 |
| 2011/0005932 | A1 | 1/2011 | Jovanovich et al. |
| 2011/0207140 | A1 | 8/2011 | Handique et al. |
| 2012/0178091 | A1 | 7/2012 | Glezer et al. |
| 2016/0051985 | A1* | 2/2016 | Knight .............. B01L 3/502746 435/286.1 |
| 2016/0325284 | A1 | 11/2016 | Camillo et al. |
| 2019/0054471 | A1 | 2/2019 | Williams et al. |

* cited by examiner

RANDOM ACCESS AUTOMATED MOLECULAR TESTING SYSTEM

RELATED APPLICATIONS

This patent application claims priority from U.S. Provisional Patent Application No. 62/994,924 filed Mar. 26, 2020.

FIELD OF THE DISCLOSURE

The disclosure herein relates generally to the field of molecular detection. More particularly, the present disclosure relates to devices and methods for quick and low-cost equipment and methods for automated molecular testing.

BACKGROUND

Polymerase Chain Reaction (PCR) is a gene amplification technique used in molecular testing of biological samples to identify a vector of interest. Specialized equipment for performing molecular testing with PCR is often expensive and only operable by trained clinicians. Also, it is typically not available "on demand" but runs in batches. The molecular PCR IVD (in vitro diagnostic) industry started with batch processes of 96 well formats. While this can deliver mass parallelism and high throughput, especially in cases with higher replicates/batch, the large number of wells affords little sample-to-sample variation and can lead to processing delays for some sample sizes smaller than 96 wells. Some companies have developed systems with smaller "batches" such as 4 replicates/module in the sample prep section and 12 reactions in the amplification detection system. The cost of the "amplification-detection" function may be distributed by requiring that reactions within a module process on synchronized PCR steps.

Another solution in the industry is parallel multiple POC (Point of Care) modules via a robotic feeder. These are based on integrated sample-prep-assay cartridges which combine sample preparation with assays and can be very expensive because they are prepackaged with bulk liquids and reagents. Manufacturing a cartridge with several types of materials to meet the different processing needs is also difficult. While each POC module could technically run independently, a large variety of cartridge types would be needed resulting in an assay library storage facility that was very bulky, large and expensive. Also, the reaction volumes in these POC systems were typically 40 μl or more and had rather slow ramp times associated with air cooling (approx. 2 degree/s). Therefore, such systems could never be fast and compact. For example, quantitative assays on these types of systems required about an hour of turnaround time (TAT) per sample.

Most PCR systems provide, at best, "mini-batching" capability where assays are run together with similar or identical protocols. This forces customers to accumulate tests which require identical protocols thus creating a queue of samples. In the case of urgent tests, such as STAT samples, speed is accomplished by occupying a fraction of the available batch process. Most commercial systems have a turnaround time of not less than 50 minutes. This total time includes the time to prepare the sample or extract the nucleic acid (sample prep) and the time to perform PCR. Most commercial systems have a batch-processing capability of at least 12 samples in the amplification and detection section and four samples in the sample preparation region. It should be emphasized that some systems claim a "flex-batch" process—but typically this involves using a subset of available reaction sites and reduces system throughput per space and increases cost. Most commercial assays were developed to perform tests on 50 μl PCR reactions, with some having as low as 20 to 25 μl reactions. This has negative impacts on theoretical limitations on cost effective speed for PCR. Up until now, there are no high throughput commercial systems capable of truly running random access PCR tests in reaction volumes less than 15 μl in a cost-effective manner with assay delivery flexibility into low-cost consumables.

SUMMARY

In a first aspect, a random access automated molecular testing system and method is used with a planar polymerase chain reaction (PCR) chip to provide molecular detection covering a wide variety of assays/tests in a small footprint. An automated transport mechanism moves the PCR chip between a pipette loading station, a sealing station and an amplification and detection module to provide batchless and random access amplification and detection of a biological sample fluid.

In a further aspect, a PCR chip for random access automated molecular testing includes a planar rectangular body; a U-shaped channel having first and second ends formed within one end of the body; an inlet port, for receiving the sample fluid, formed in the body opposite the U-shaped channel and connected to the first end of the U-shaped channel by a first passage, said first passage further comprising a first overflow reservoir between the inlet port and the first end; a vent port formed in the body opposite the U-shaped channel and adjacent to the inlet port, the vent port connected to second end of the U-shaped channel by a second passage, said second passage further comprising a second overflow reservoir between the vent port and the second end; and a gripping feature laterally extending from an upper surface of the body above the inlet port and the vent port.

In another aspect, an amplification and detection module includes a heating block operatively coupled to a controller for causing controlling the heating block to cycle through a plurality of temperatures; a clip for retaining a planar polymerase chain reaction (PCR) chip holding an aliquot of fluid to be tested in a sealed channel adjacent to the heating block, said clip including a viewing window; and a detection platform adjacent to the viewing window and operatively coupled to the controller for identifying a content characteristic of interest of the aliquot of fluid.

DETAILED DESCRIPTION

Figure 1A:
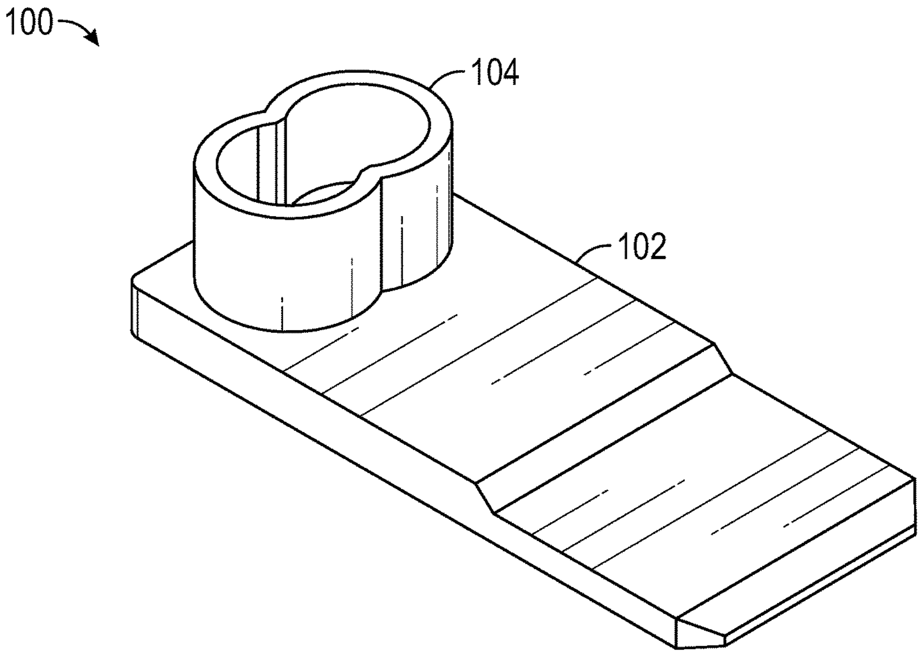
FIG. 1A depicts a top perspective view of a PCR chip for random access automated molecular testing, in embodiments.

In general, PCR (polymerase chain reaction) testing has two main processes: sample preparation (SP) and amplification and detection (AD). Testing and/or identifying nucleic acids, for example, in a biological fluid sample requires sample preparation to isolate nucleic acids for further processing. In general, sample preparation involves lysing or liberating nucleic acids (NA) from sample material in a liquid state then separating the NAs in an eluate in a process that may involve several steps.

A lower standard cost of PCR assays and faster TAT is provided by random access testing and low reagent usage that concentrate the nucleic acids from biological sample into a smaller elution volume. In embodiments, the nucleic acids from standard working volumes, for example, 50 µl, are concentrated into a smaller liquid volume, such as approximately 5 to 10 µl. In other words, if a larger volume of eluate contained 100 target nucleic acid molecules and was processed in 50 µl PCR reactions, the random access automated molecular testing system disclosed herein operates on the same 100 molecules in a smaller 5 or 10 µl reaction volume. Therefore, there is no loss in sensitivity as all the nucleic acids available in the sample are captured as efficiently as in a larger eluate.

For purposes of illustration, a representative example of sample preparation will now be described, although embodiments described herein are not limited to this method and other methods may be used. Each patient sample is processed within a consumable. The sample prep consumable typically would contain separate chambers (process element volumes) to process each of the steps. Once a patient sample has been aspirated into the sample prep consumable, a sample preparation process may be broadly described as including the following steps:

1. Lysing or liberating nucleic acids (NA) from biological containment (virus or cells) in sample material in a liquid state. In embodiments, a lysis buffer is added to the sample material. This is a reagent that releases NA and facilitates NA binding to paramagnetic beads.

2. Attaching the NAs to the surface of the paramagnetic beads. The NAs are trapped on the beads and the beads are transported between chambers via magnetic attraction and mechanical movements.

3. Washing the beads and attached NAs to remove inhibitors and supernatant from the reaction. This may be repeated several times to eventually dilute away the background and inhibitors. The wash is facilitated using a wash buffer. Each wash buffer may be different or the same depending on details of the assay.

4. Eluting to remove the nucleic acids from the beads. This step is facilitated with the use of an elution buffer. Magnetic forces and manipulation of the magnetic field may also be used to separate the eluted NA, now suspended in the elution buffer, from the solid phase of the beads.

5. Transporting the nucleic acids, in liquid form (eluate) to another location for incorporation with downstream process such as PCR. A pipettor can aspirate the eluate for subsequent processing.

The steps described above are representative. Variations may be made to prepare samples for different assays.

The eluate, or concentrated nucleic acids, is then combined with other reagents for amplification and detection (AD). In embodiments, a random access automated molecular testing system includes modules, systems and methods for performing PCR AD without batch processing. Batchless processing provides complete flexibility in running AD protocols. This includes being able to run a melt assay on one AD module while performing an entirely different protocol on another module without any requirement that the protocols be synchronized.

Figure 1B:
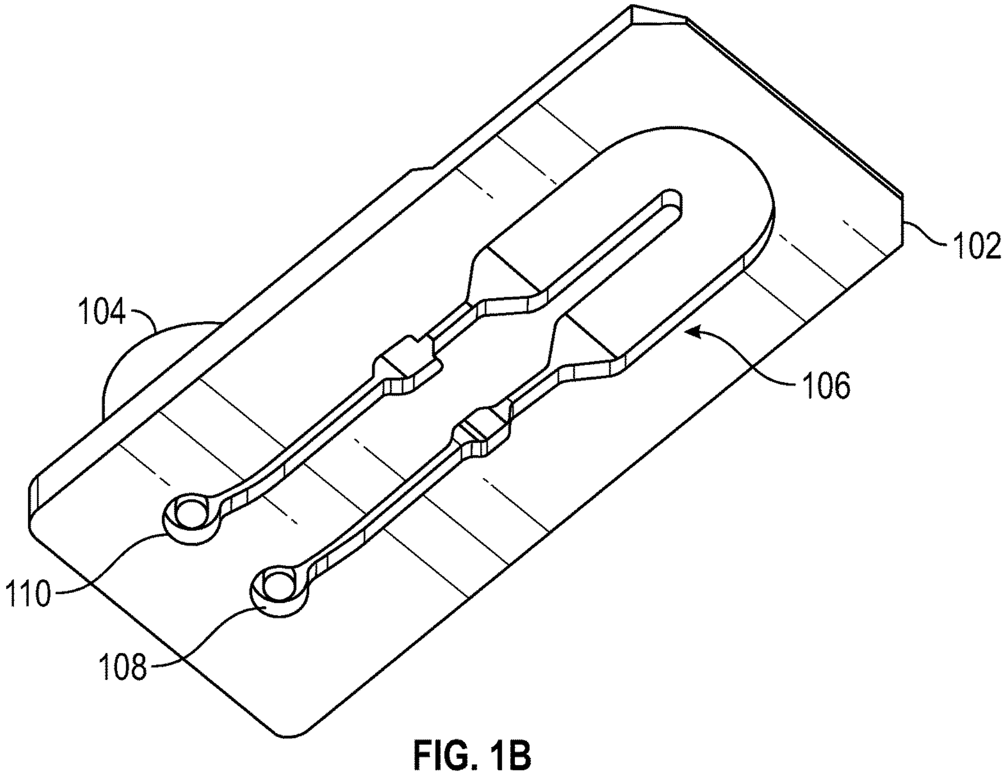
FIG. 1B depicts a bottom perspective view of the PCR chip of FIG. 1A, in embodiments.

FIGS. 1A and 1B depict a top and bottom perspective views of a PCR chip 100 for random access automated molecular testing, in embodiments. PCR chip 100 includes a planar body 102 that is generally rectangular and a gripping feature 104 laterally extended from an upper surface of one end of planar body 102. Planar body 102 includes internal features generally indicated at 106, including ports 108 and 110, that are used for filling and retaining an eluate for PCR amplification and detection. In embodiments, PCR chip 100 is approximately 18 mm long by 8 mm wide. In embodiments, planar body 102 and gripping feature 104 are molded from a plastic such as polypropylene but any plastic that can withstand temperatures of PCR thermal cycling and that is not autofluorescent may be used. Dimensions used herein are for purposes of illustration and are not limiting.

Internal features 106 provide PCR AD on an aliquot of eluate, such as 5 or 10 µl, by leveraging advances in component technology. For example, advances in electronics components in analog and digital processing, communications, LED, photodetectors and general-purpose processors, magnetics, sample preparation technology, and micromolding allowed for high-throughput platforms to be created from replicas of unit process module subsystems and small volume PCR chips. In embodiments, internal features 106 are formed in a bottom surface of planar body 102, then sealed with a film laminated to the bottom of planar body 102. In embodiments, the film is an aluminum tape with silicone adhesive but any laminate with low autofluorescence and good adhesion to polypropylene may be used.

In the following description, internal features 106 of PCR chip 100 will be described in more detail followed by a description of the modular processing system for performing assays using PCR chips 100.

Figure 2A:
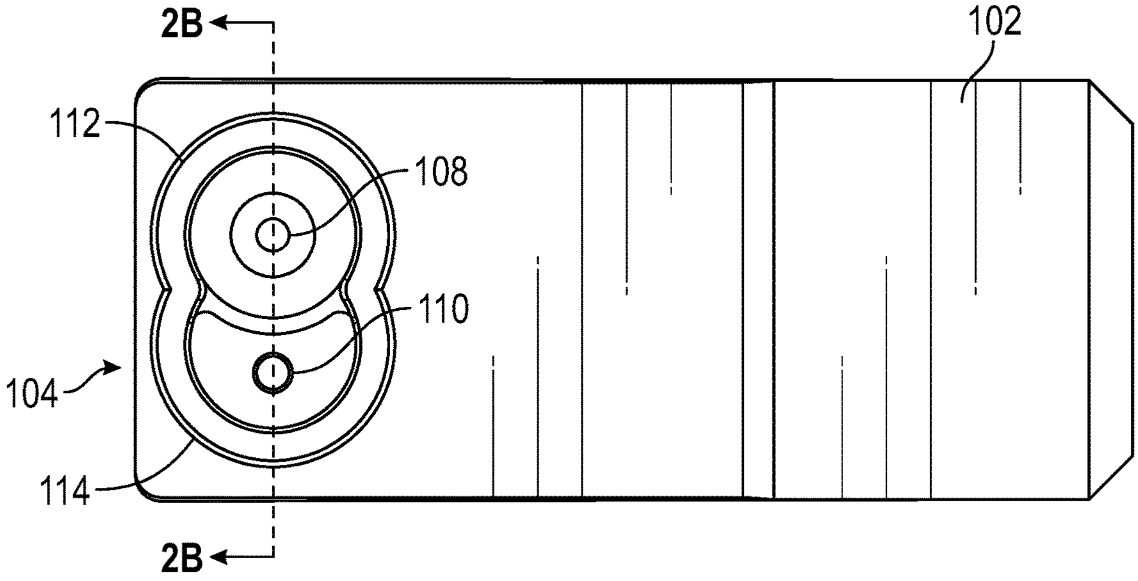
FIG. 2A depicts a top view of the PCR chip of FIGS. 1A and 1B, in embodiments.
Figure 2B:
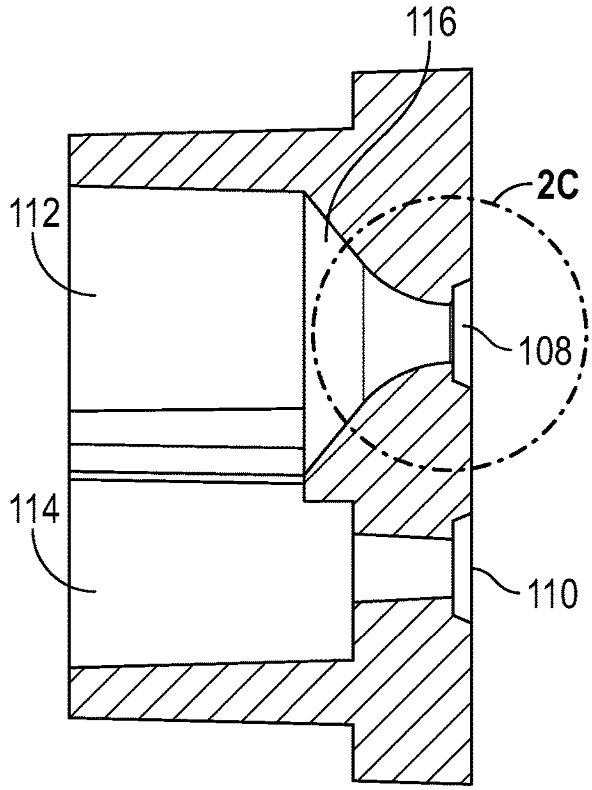
FIG. 2B depicts a cross-sectional view of the PCR chip of FIG. 2A.
Figure 2C:
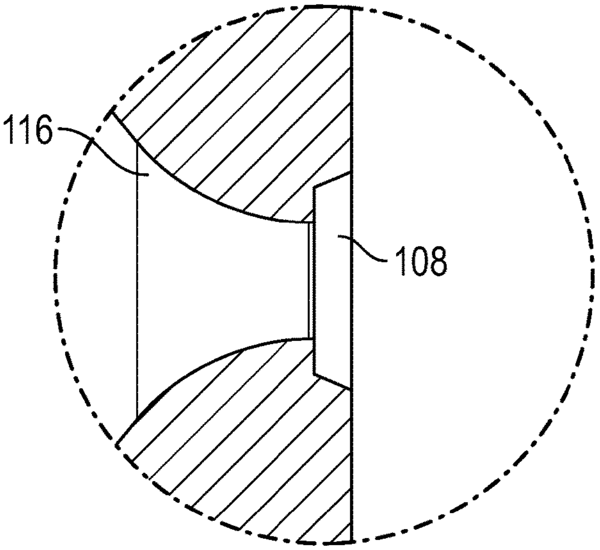
FIG. 2C depicts a detail view of the PCR chip of FIG. 2B.

FIG. 2A depicts a top view of the PCR chip of FIGS. 1A and 1B. FIG. 2B depicts a cross-sectional view along line 2B-2B of FIG. 2A. FIG. 2C depicts a detail view from FIG. 2B. FIGS. 2B and 2C do not depict the film laminated to the bottom of planar body 102. FIGS. 2A-2C are best viewed together in the following description.

FIG. 2A shows gripping feature 104 includes two overlapping cylinders 112 and 114. Ports 108 and 110 are centered with cylinders 112 and 114 respectively. Inlet port 108 receives a PCR eluate through a pipette or other filling device. Cylinder 112 ends in a curved or tapered surface 116 where it meets inlet port 108. This surface provides a seal with a tip of a pipette and also helps compensate for chips that may be off axis during automated processing. FIG. 2C depicts a detail view of FIG. 2B showing curved surface 116. Although a specific curvature is shown, a variety of profiles may be used to provide sealing and alignment of chip 100 during a filling process. Vent port 110 in cylinder 114 serves as a vent during a filling process. Cylinders 112 and 114 of gripping feature 104 provide a mechanism for gripping and moving chip 100 during automated processing, and also serve as a containment or overflow reservoir for fluid during a filling process.

Figure 3A:
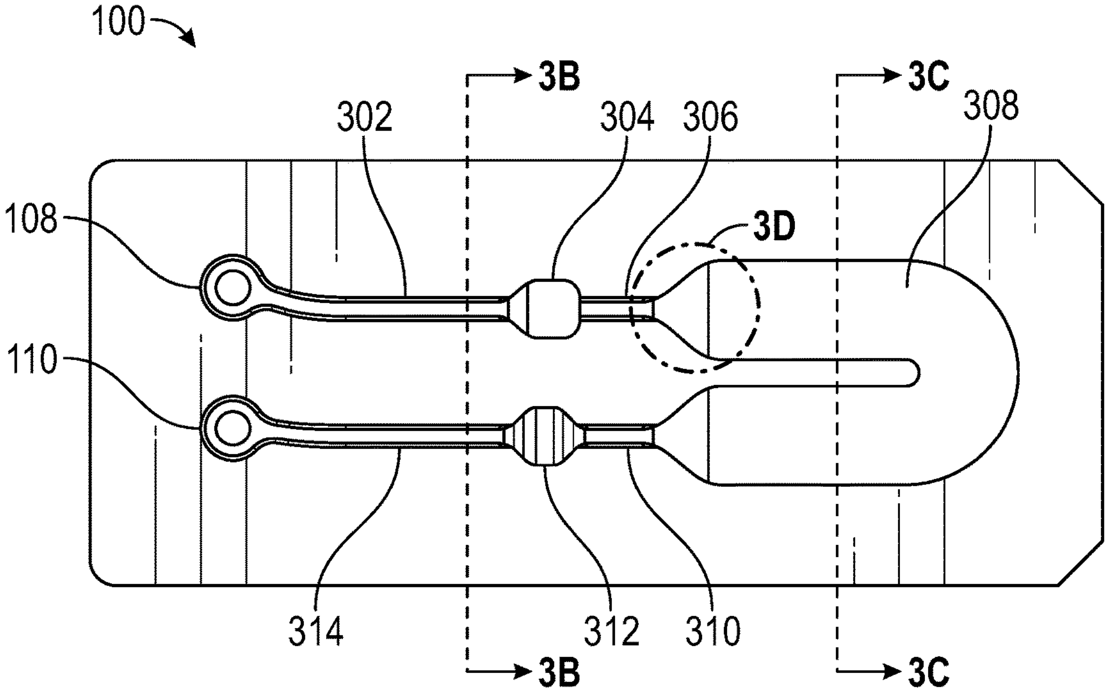
FIGS. 3A-3D depict internal features of the PCR chip of FIGS. 1A and 1B, in embodiments.
Figure 3B:
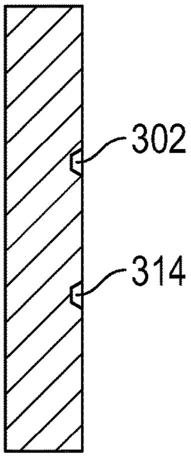
Figure 3C:
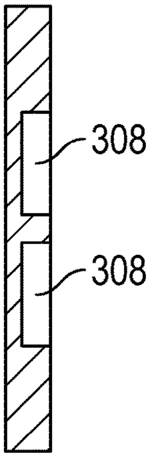
Figure 3D:
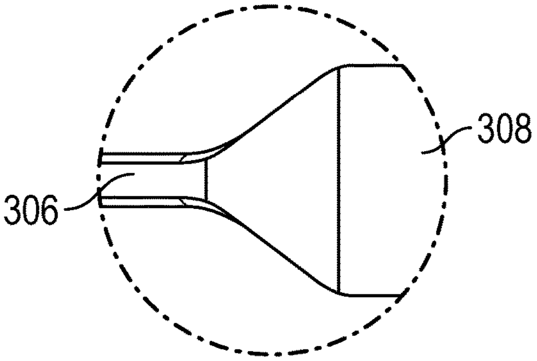

FIG. 3A depicts a bottom view of the PCR chip 100 including internal features 106, in embodiments. FIGS. 3B and 3C depict cross-sectional views and FIG. 3D depicts a detailed view of the PCR chip of FIG. 3A. FIGS. 3B and 3C do not depict the film laminated to the bottom of planar body 102.

An eluate is introduced into PCR chip 100 through inlet port 108 while vent port 110 provides a vent as described above. From inlet port 108, eluate travels through passage 302, reservoir 304 and passage 306 to one end of U-shaped channel 308. The other end of U-shaped channel 308 is connected to vent port 110 through passage 310, reservoir 312 and passage 314. In embodiments, U-shaped channel 308 is sized to hold approximately 10 μl of eluate. In embodiments, the fluid volume within the PCR chip 100 is less than 12 μl and typically less than 10 μl and more than 2 μl. Furthermore, PCR chip 100 is thermally sealed with a largely planar construction providing a fluid thickness in U-shaped channel 308 not exceeding approximately 0.5 mm.

FIG. 3B depicts a cross-sectional view of passages 302 and 314 along line 3B-3B. FIG. 3C depicts a cross-sectional view of U-shaped channel 308 along line 3C-3C. In embodiments, passages 302 and 314 have a width of approximately 0.25 mm. Each arm of U-shaped channel 308 in FIG. 3C has a width of approximately 1.75 mm. The heights of passages 302 and 314 as measured relative to the overall height of planar body 102 are flexible as long as they provide unimpeded flow for eluate. Passages 306 and 310 are similar to passages 302 and 314. The height and width of U-shaped channel 308 are flexible as long as a volume of approximately 10 μl is provided.

FIG. 3D depicts a detailed view of the connection between passage 306 and U-shaped channel 308. The specific shape is illustrative and any transition between the smaller width of the passage and the larger width of the U-shaped channel may be used. The connection between U-shaped channel 308 and passage 310 is similar.

Figure 4A:
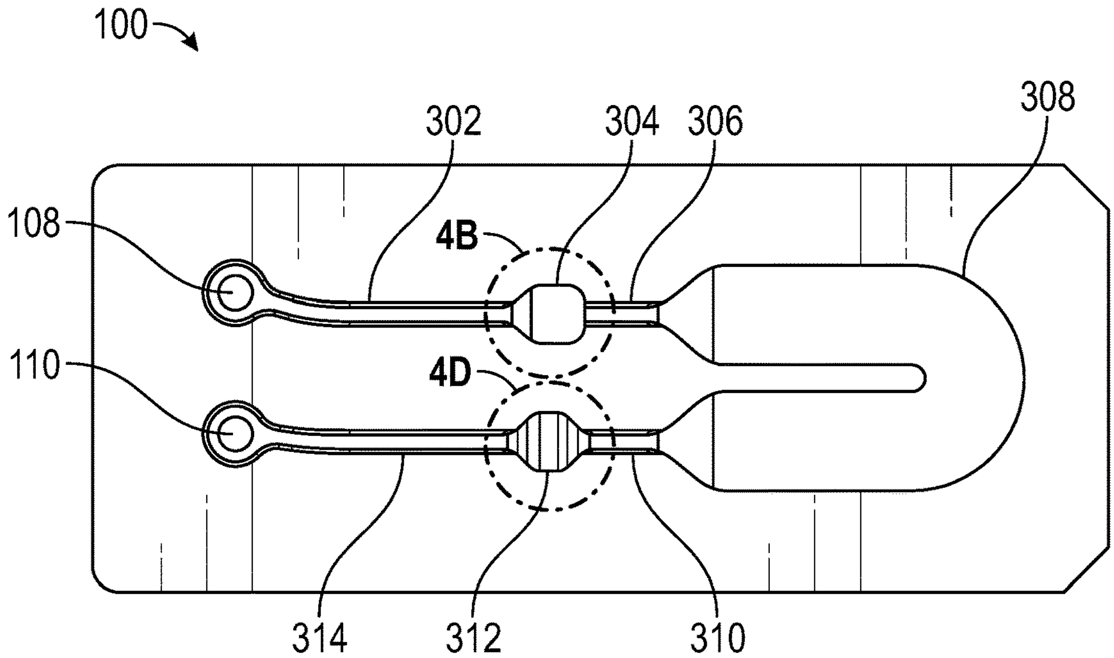
FIGS. 4A-4E depict additional internal features of the PCR chip of FIGS. 1A and 1B, in embodiments.
Figure 4B:
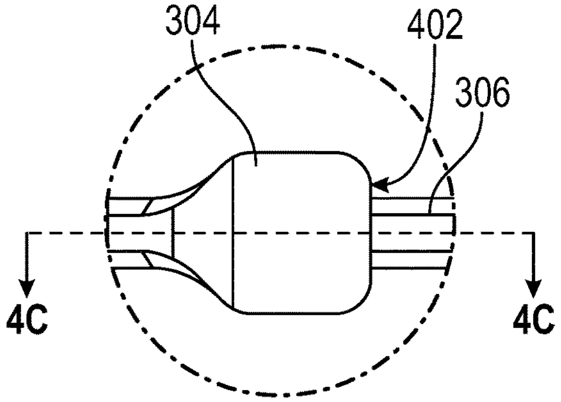
Figure 4C:
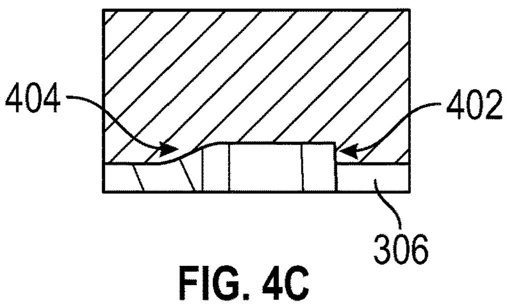
Figure 4D:
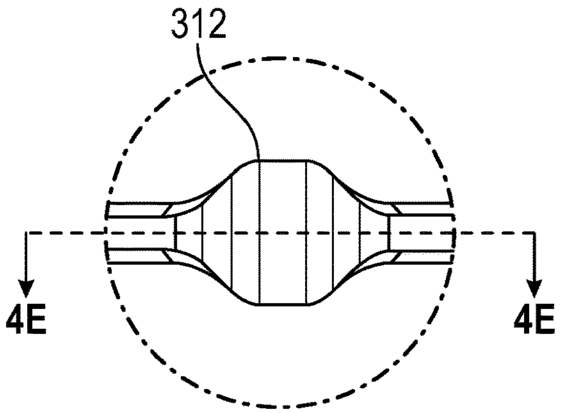
Figure 4E:
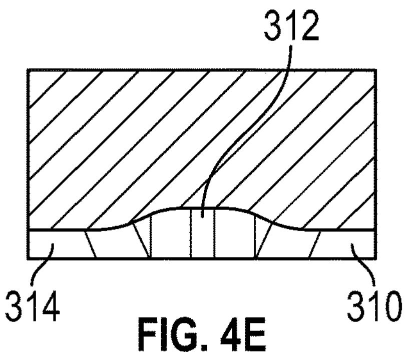

FIG. 4A depicts a bottom view of the PCR chip 100 including internal features 106, in embodiments. FIG. 4B depicts a detailed view of reservoir 304 and FIG. 4C depicts a cross-sectional view of reservoir 304 along line 4C-4C. FIG. 4D depicts a detailed view of reservoir 312 and FIG. 4E depicts a cross-sectional view of reservoir 312 along line 4E-4E.

Reservoirs 304 and 312 serve as volume reservoirs for fluid overflow when eluate is sealed in U-shaped channel 308, as described in more detail below. As eluate enters inlet port 108, it flows through passage 302 to reservoir 304. Although reservoir 304 is depicted as a square with rounded corners, this specific shape is not required so long as a sharp edge is provided at 402. This sharp edge acts as a pinning region to prevent capillary flow and retains fluid in U-shaped channel 308. As shown in FIG. 4C, reservoir 304 has a greater height than passages 302 and 306. Sharp edge 402 forms an approximately 90-degree angle with passage 306 in both the horizontal direction along the width of PCR chip 100 as shown in FIG. 4B and in the vertical direction along the height of PCR chip 100 as shown in FIG. 4C. Edge 404 between reservoir 304 and passage 302 is angled. In embodiments, reservoir 312 of FIGS. 4D and 4E has a circular shape and gradual transition between reservoir 312 and passages 310 and 314.

Figure 5A:
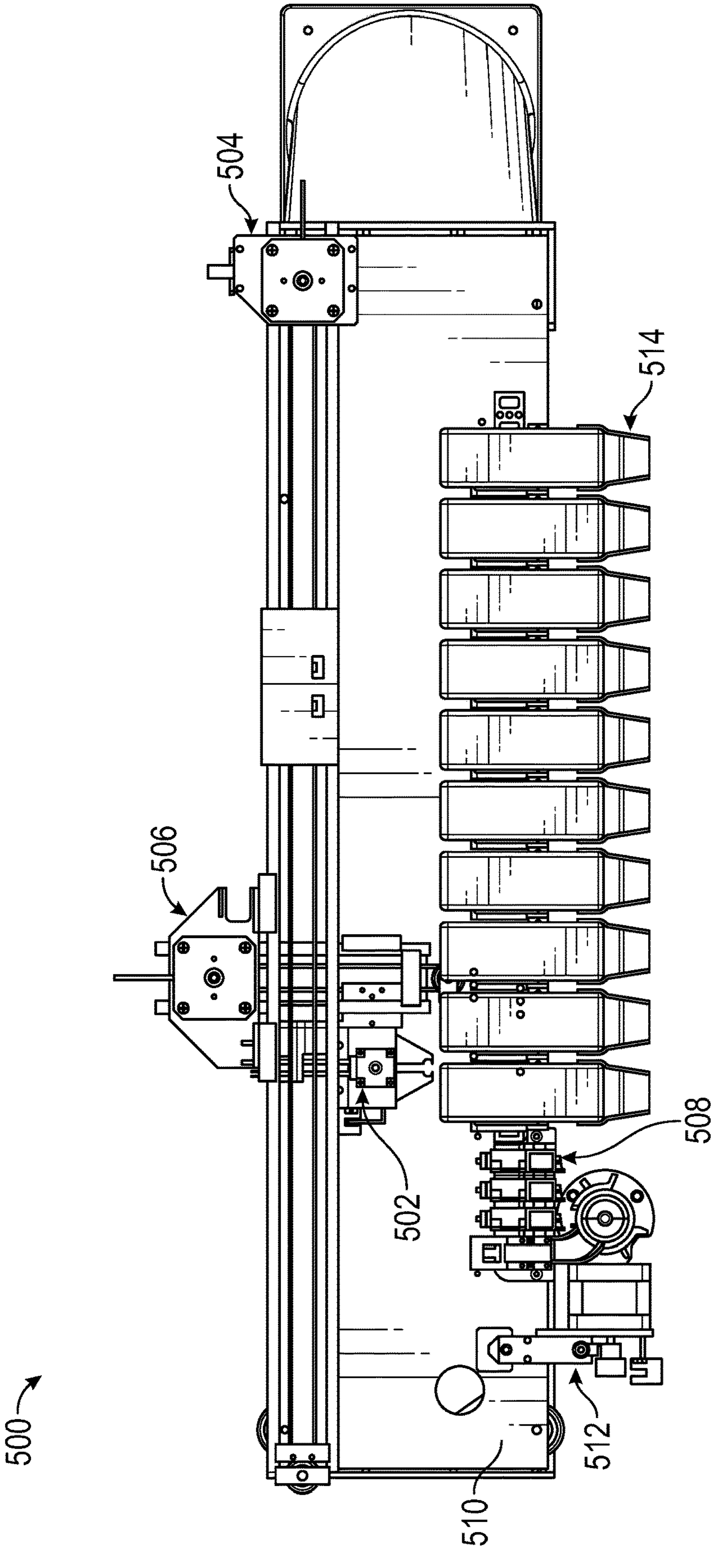
FIGS. 5A-5B depict a system for performing amplification and detection using the PCR chip of FIGS. 1A and 1B, in embodiments.
Figure 5B:
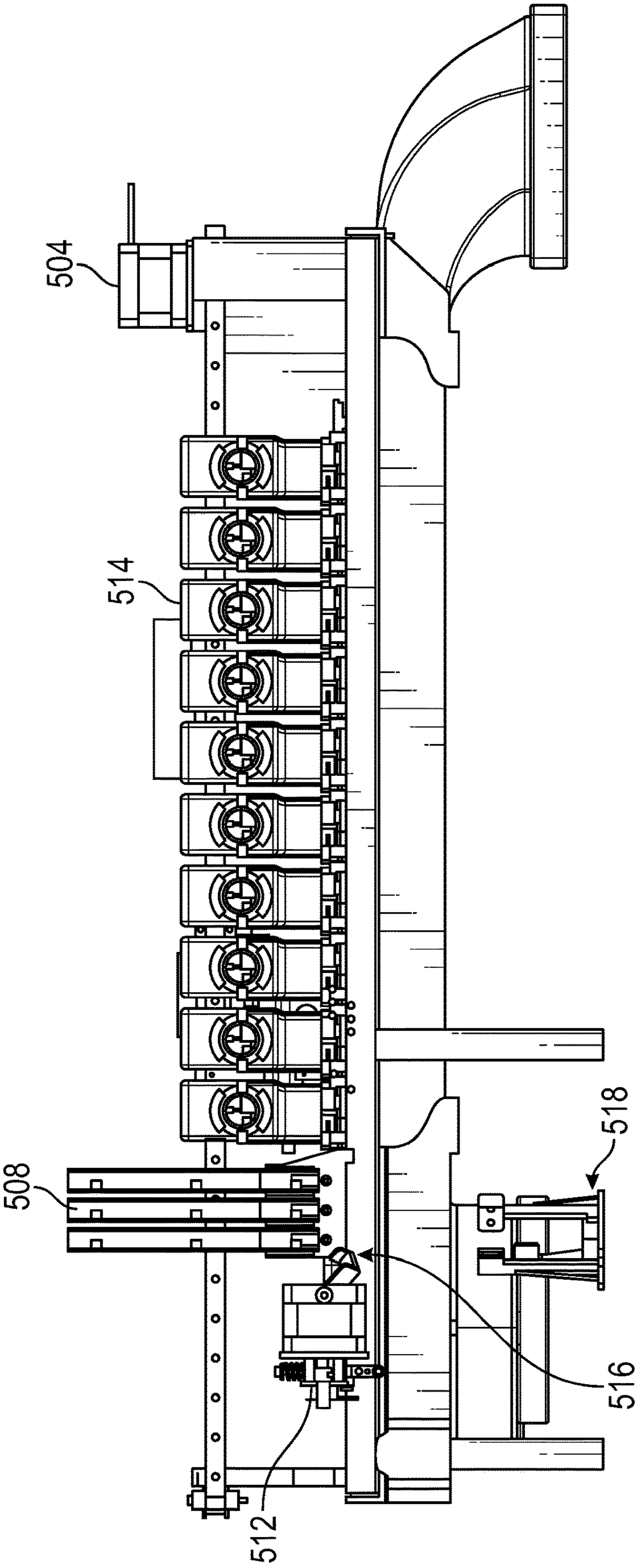

PCR chip 100 may be used with a random access automated molecular testing system 500 as shown in FIGS. 5A-5B, in embodiments. FIG. 5A depicts a top view of system 500 and FIG. 5B depicts a side view. FIGS. 6, 7A, 7B, and 8-10 depict detailed views of various aspects of system 500. FIGS. 5A-10 are best viewed together in the following description.

Figure 6:
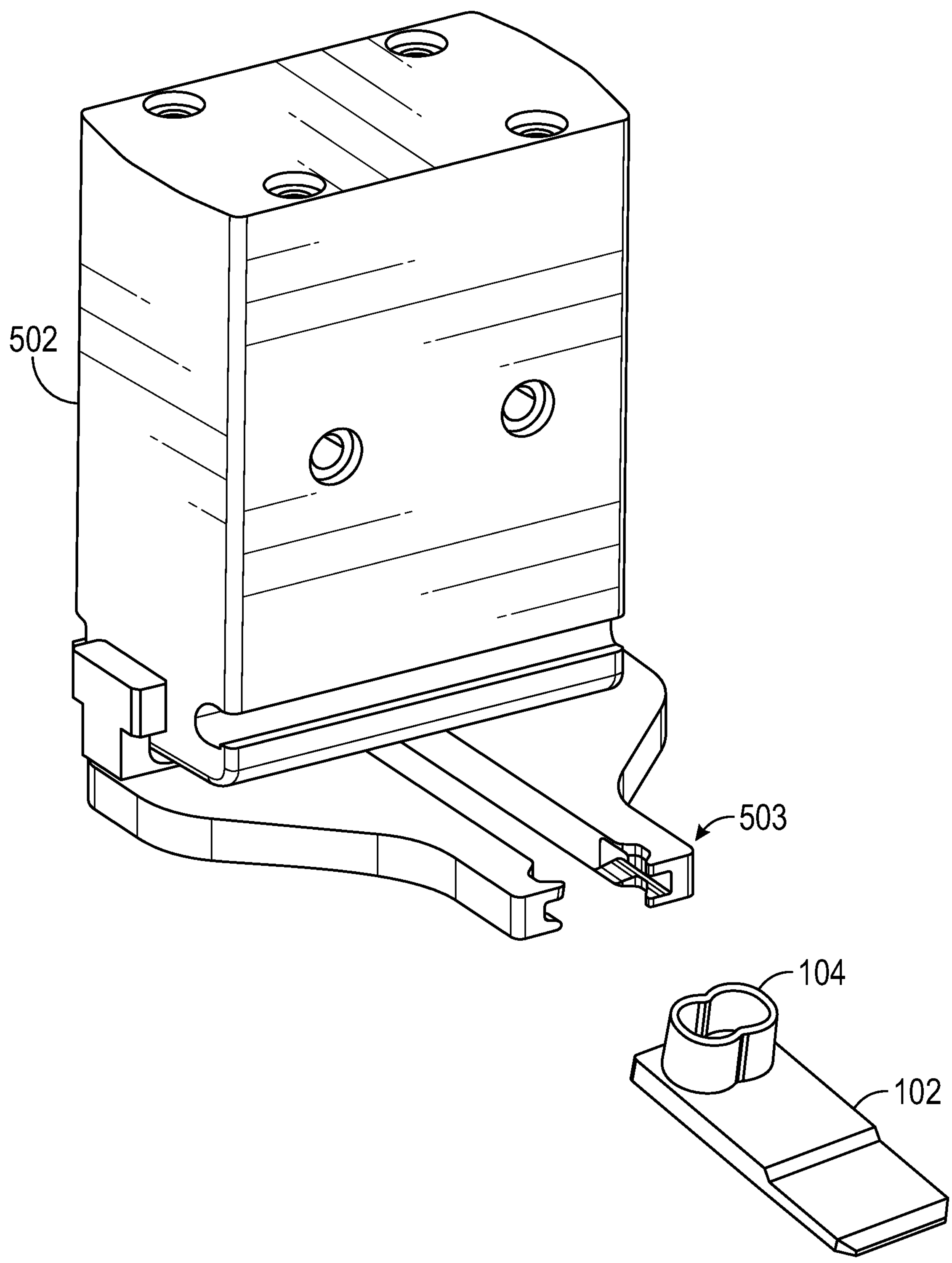
FIG. 6 depicts a gripper used in the system of FIGS. 5A-5B, in embodiments.
Figure 10:
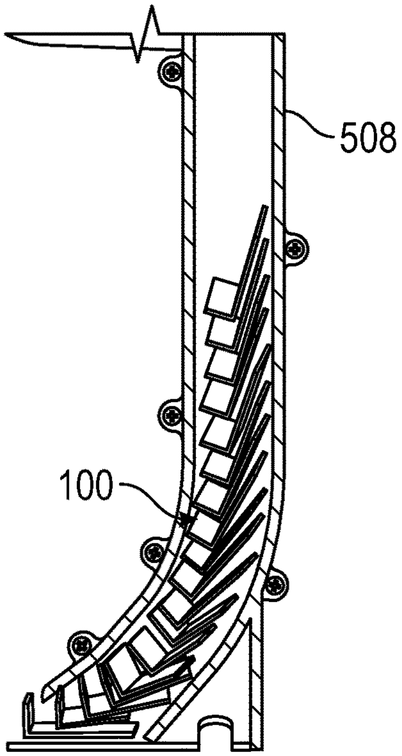
FIG. 10 depicts a chip feeder for use in the system of FIGS. 5A-5B, in embodiments.

System 500 provides an automated transport mechanism for performing a PCR assay by moving PCR chips 100 between several processing stations. Elements of system 500 may be controlled with a controller including hardware and software for storing and executing computer-implemented instructions. Gripper 502 may be controlled to move in X and Y directions using chip transport system including X-axis drive 504 and Y-axis drive 506. Other chip transport mechanisms are contemplated. Gripper 502 retrieves a chip from one of three chip feeders 508. As shown in FIG. 6, jaws 503 of gripper 502 are adapted for reversible lateral movement to selectively grasp gripping feature 104 of PCR chip 100. Although three chip feeders with a capacity of approximately 25 chips each are shown, any number and capacity of chip feeders 508 may be provided. A cross-sectional side view of a chip feeder 508 is shown in FIG. 10, in embodiments. As shown, each chip feeder is adapted to retain a substantially vertical plurality of PCR chips 100, with the gripping feature 104 of each disposed towards an open end of the respective chip feeder, such that the gripping feature 104 of the lowest PCR chip 100 may be engaged by a gripper 502. Other arrangements that allow an automated gripper to select a single chip are contemplated.

Gripper 502 moves a selected PCR chip 100 to pipette loading station 510 at which one or more pipettes (not shown) are used to introduce an eluate and assay reagents to inlet port 108 as described above. Next, PCR chip 100 is moved to sealing station 512. Referring to FIG. 4A, passages 306 and 310 are heat sealed to prevent evaporation and leaks during thermal cycling. Heat sealing may also or alternatively be applied to passages 302 and 314. A goal of heat sealing is also to minimize the air volume in U-shaped channel 308 because this creates internal pressure during cycling and causes chip 100 in the region of U-shaped channel 308 to flex. Reservoirs 304 and 312 provide for volume overflow when passages 306 and 310 are sealed.

After sealing, gripper 502 moves the filled and sealed PCR chip 100 to one of amplification and detection (AD) modules 514, shown in more detail in FIGS. 7A, 7B, 8 and 9. Each AD module 514 is comprised of a detection platform 704 oriented to receive a largely planar PCR chip 100. In embodiments, detection platform 704 includes an LED and camera-based detection system such as CMOS cameras or photodetectors. Detection platform 704 interrogates a field of view through viewing window 706 corresponding to U-shaped channel 308 containing a volume of eluate and assay reagent to identify a characteristic of interest. PCR chip 100 is thermally sealed and the planar construction provides a small distance between the fluid volume and temperature controlled surface 708, for example the thickness of fluid in U-shaped channel 308 does not exceed approximately 0.5 mm. In embodiments, temperature controlled surface 708 may be a Peltier heater. Further, PCR chip 100 allows for single-pipette based loading and with a thermal contact force generated without additional discrete bearings or linkages. Temperature sensing element 710 is used to provide feedback to a controller for control the thermal cycling of surface 708.

Figure 7A:
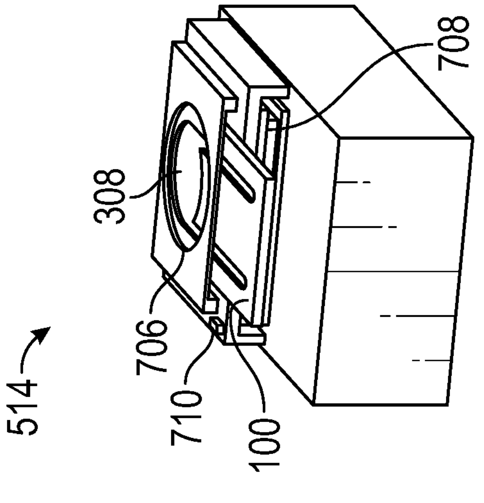
FIGS. 7A-7B depicts a module for use in the system of FIGS. 5A-5B, in embodiments.
Figure 7B:
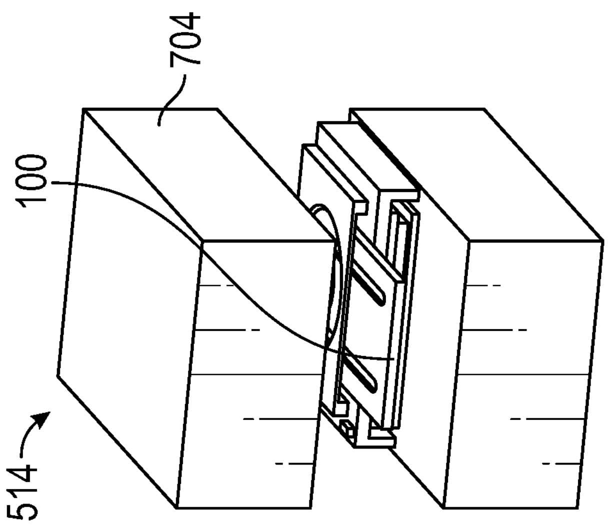
Figure 8:
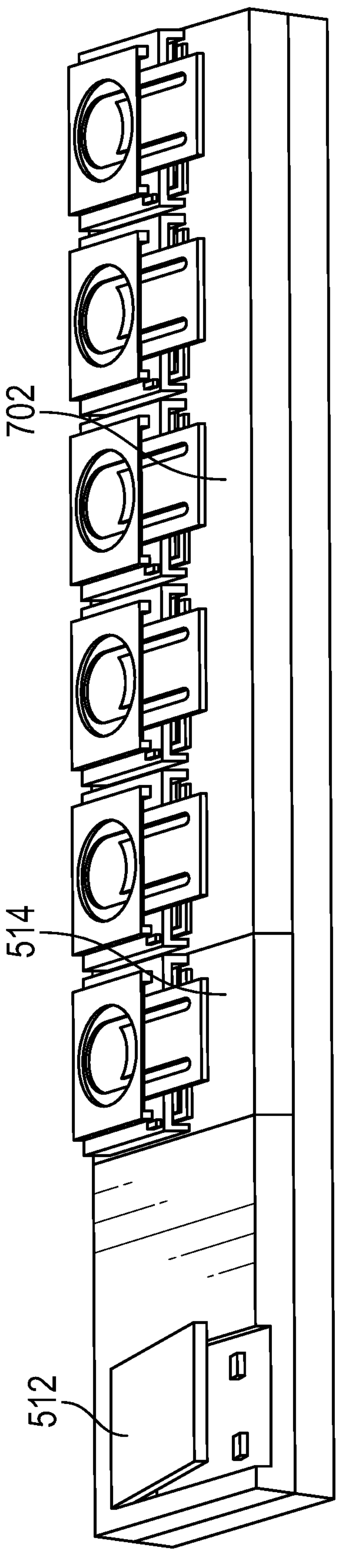
FIG. 8 depicts a series of modules for use in the system of FIGS. 5A-5B, in embodiments.
Figure 9:
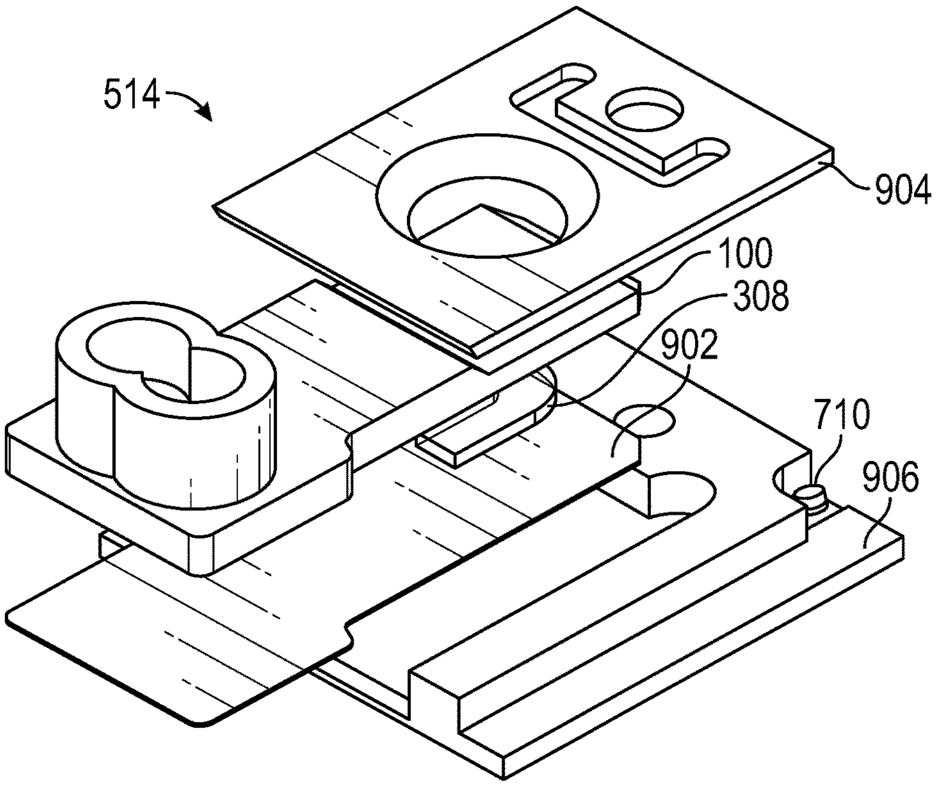
FIG. 9 depicts an exploded view of the module of FIGS. 7A-7B.

FIG. 9 depicts an exploded view of the module 514 of FIGS. 7A-7B. The bottom of PCR chip 100 is laminated to aluminum foil 902 to retain fluid volume in U-shaped channel 308. Aluminum clip 904 acts as a spring to retain PCR chip 100 against aluminum block 906. The use of a passive spring force ensures thermal contact and sliding PCR chip 100 into clip 904 is automation friendly. In embodiments, heating block 906 is a thermoelectric cooler. Aluminum foil 902 acts as a thermal spreader to improve heat transfer from block 906 to U-shaped channel 308. Aluminum foil 902 also acts as a reflective surface to enhance optical readings because it is opaque and thus blocks any debris or dust on block 906 that might impact analysis.

Automated molecular platform 702 includes a series of coplanar AD modules 514. AD modules on platform 702 may be controlled individually or as a group.

After the AD process is completed, gripper 502 moves PCR chip 100 to waste chute 516 for disposal in a tube (not shown) retained in tube holder 518.

In embodiments, several variations of the system described herein are contemplated. AD module 514 may be considered to be an assembly of submodules. These submodules facilitate design and manufacturing, service and calibration activities. AD module 514 may be:

An amplification only module—in which case a chip is PCR amplified in one module but reading is accomplished at end-point (typical of a dPCR and certain qualitative assays) in another module.

A detection module—in which a pre-amplified chip is inserted into an "end-point" reading module. The detection module could be an image based detection of sub-reactions within the chip or integral detection, such as with a photodiode or small photomultiplier tube (sPMT).

A combined module—the AD thermal control and amplification is coupled to the detection module via a certain correspondence and appropriately calibrated. The trade-offs between a combined module and special purpose modules is that a combined module is not the most cost-effective approach if all the assays are an endpoint (for example a melt assay). However, this approach affords the greatest flexibility and one less transport step.

Figure 11:
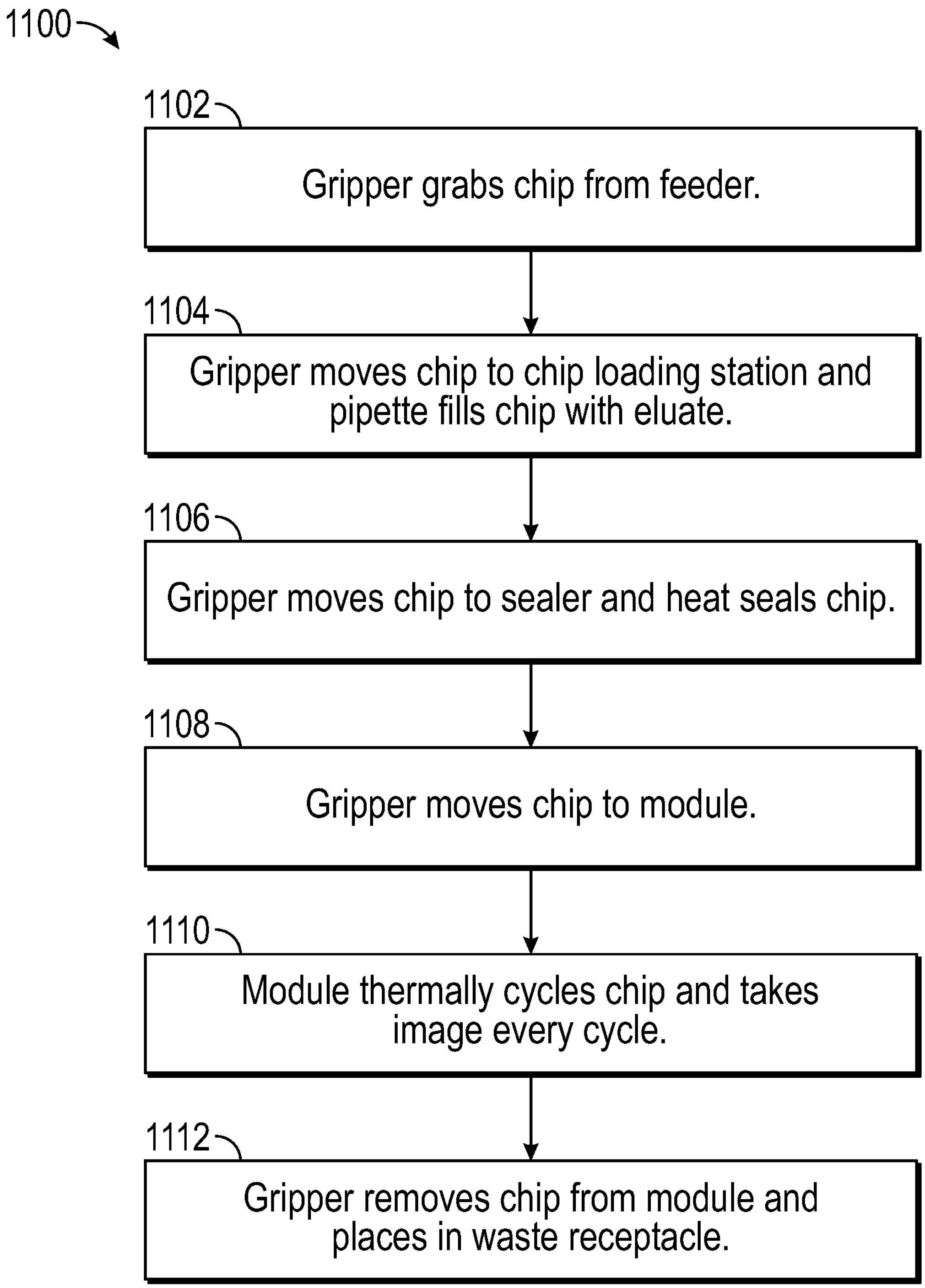
FIG. 11 depicts a flowchart illustrating a method of PCR testing, in embodiments.

FIG. 11 depicts a flowchart illustrating a method 1100 of random access automated molecular testing, in embodiments.

Step 1102 includes retrieving a PCR chip from a chip feeder. In an example of step 1102, gripper 502 selects a PCR chip 100 from chip feeder 508.

Step 1104 includes filling the selected PCR chip with an eluate and assay reagent. In an example of step 1104, gripper 502 moves PCR chip 100 to pipette loading station 510 where it is filled from one or more pipettes.

Step 1106 includes sealing the PCR chip. In an example of step 1106, gripper 502 retrieves PCR chip 100 from pipette loading station 510 and moves it to sealing station 512 where at least passages 306 and 310 are heat sealed.

Step 1108 includes moving the PCR chip to an AD module for analysis. In an example of step 1108, gripper 502 retrieves PCR chip 100 from sealing station 512 and automatically moves it to any AD module 514 in platform 702. The selection and processing of an AD module 514 may be automatically controlled by a computer processor executing instructions stored in a non-transitory memory.

Step 1110 includes performing an AD assay. In an example of step 1110, AD module 514 is thermally cycled while detection platform 704 takes an image through viewing window 706 every cycle.

Step 1112 includes removing the PCR chip from the module for disposal. In an example of step 1112, gripper 502 removes PCR chip 100 from AD module 514 after thermal cycling is complete and places it in waste chute 516 for disposal in a tube (not shown) retained in tube holder 518.

As disclosed herein, a PCR chip has a form factor such that many different future types of assays could be run by simply changing the assay supply with minimal modification to the balance of the system thereby supporting a product family. In embodiments, modified chips would be part of a library of chips and that could be processed using independently controlled modules or assay-specific modules that utilized similar technologies, power, communication architecture and size requirements. Other processing variations may be accommodated without having to fundamentally change the way assay reagents were loaded, and chips were used and transported. In addition, separating the sample preparation (SP) and amplification and detection (AD) processes into separate devices allows the most appropriate and minimal materials to be selected according to utilization (material specification, packaging, transport) for the AD consumable. It also provides maximum flexibility in materials selections for the PCR chip vs the SP consumable. For example, in the case where a random access automated molecular testing system requires a higher temperature grade and more stable plastic, or a plastic with certain wetting, autofluorescence or porosity requirements, this could be supported while maintaining minimum plastic costs on the SP consumable and other more commonly used PCR chips.

A random access automated molecular testing system 500 for amplification and detection may be used with a sample preparation process to provide a complete system. In embodiments, an assembly line sample preparation process, or extraction, may be delivered to individual detection channels. Sample extraction channels may have an approximately 15 minute total process time with a throughput of 45 extractions/hour/channel or 45×3=135 extractions/hour. AD channels receiving prepared samples may have an approximately 20 minute total process time with a throughput of 3 reactions/hour/channel or 60×3=180 reactions/hour.

Alternatively, individual sample extraction channels may be delivered to individual detection channels. Sample extraction channels may have an approximately 6 minute total process time with a throughput of 10 extractions/hour/channel or 10×12=120 extractions/hour. AD channels receiving prepared samples may have an approximately 20 minute total process time with a throughput of 3 reactions/hour/channel or 60×3=180 reactions/hour.

Changes may be made in the above methods and systems without departing from the scope hereof. For example, PCR chips may be loaded into the system in a variety of ways, including bowl-fed, from a tape, a cartridge or a plate-based format. PCR chips may be provided with thermally conductive window for scanning, or may be scanned from both sides or either side. In addition, a PCR chip may be used with an amplification-only or a detection-only module as disclosed herein.

It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. An amplification and detection module, comprising:

a heating block operatively coupled to a controller for controlling the heating block to cycle through a plurality of temperatures;

a clip having a planar body attached to the heating block, the planar body and the heating block defining a receiving space between the clip and the heating block for slidably receiving and retaining a planar polymerase chain reaction (PCR) chip holding a single aliquot of fluid to be tested in a sealed channel between the clip and the heating block, the clip configured to apply a passive spring-biased force to the PCR chip, once slidably received, in order to ensure thermal contact between said PCR chip and the heating block, said clip further comprising a viewing window in the planar body aligned with a thermally conductive window of the PCR chip when the PCR chip is retained by the clip; and a detection platform adjacent to the viewing window and operatively coupled to the controller for identifying, through the viewing window of the clip, a characteristic of interest of the single aliquot of fluid, wherein the amplification and detection module is configured to be disposed adjacent to at least one additional amplification and detection module in a coplanar series.

2. The module of claim 1, wherein the heating block and the clip are comprised of aluminum.

3. The module of claim 1, further comprising a temperature sensing element for providing feedback from the heating block to the controller.

4. The module of claim 1, wherein the detection platform further comprises a complementary metal-oxide-semiconductor (CMOS) camera.

5. The module of claim 1, wherein the detection platform further comprises a photodiode.

6. The module of claim 1, wherein the clip further comprises a passive spring to provide the spring-bias for holding the PCR chip in place against the heating block.

7. The module of claim 1, wherein the clip is oriented to receive the PCR chip.

8. The module of claim 1, wherein the viewing window corresponds to the sealed channel of the PCR chip.

9. The module of claim 1, wherein the heating block is a Peltier heater.

10. The module of claim 1, wherein the heating block is a thermoelectric cooler.

11. The module of claim 1, wherein the detection platform is configured to take an image of the PCR chip through the viewing window.

12. An automated molecular platform comprising a plurality of amplification and detection modules, each amplification and detection module comprising:

a heating block operatively coupled to a controller for controlling the heating block to cycle through a plurality of temperatures;

a clip having a planar body attached to the heating block, the planar body and the heating block defining a receiving space between the clip and the heating block for slidably receiving and retaining a planar polymerase chain reaction (PCR) chip holding an aliquot of fluid to be tested in a sealed channel between the clip and the heating block, the clip configured to apply a passive spring-biased force to the PCR chip, once slidably received, in order to ensure thermal contact between said PCR chip and the heating block, said clip further comprising a viewing window aligned with a thermally conductive window of the PCR chip when the PCR chip is retained by the clip; and a detection platform adjacent to the viewing window and operatively coupled to the controller for identifying a characteristic of interest of the aliquot of fluid, wherein the plurality of amplification and detection modules are disposed adjacently in a series.

13. The module of claim 12, wherein, for each amplification and detection module, the clip comprises a passive spring configured to provide the spring-bias for holding the PCR chip to retain the PCR chip against the heating block.

14. The module of claim 12, wherein the plurality of amplification and detection modules are coplanar.

15. An amplification and detection module, comprising:

a heating block operatively coupled to a controller configured to control the heating block to cycle through a plurality of temperatures;

a clip having a planar body attached to the heating block, the planar body and the heating block defining a receiving space between the clip and the heating block configured to slidably receive and retain a planar polymerase chain reaction (PCR) chip holding a single aliquot of fluid to be tested in a sealed channel between the clip and the heating block, the clip configured to apply a passive spring-biased force through comprising a passive spring configured to ensure thermal contact between the PCR chip, once slidably received, and the heating block, said clip further comprising a viewing window in the planar body aligned with a thermally conductive window of the PCR chip when the PCR chip is retained by the clip;

a detection platform adjacent to the viewing window and operatively coupled to the controller, the detection platform further comprising a complementary metal-oxide-semiconductor (CMOS) camera configured to identify, through the viewing window of the clip, a characteristic of interest of the single aliquot of fluid; and a temperature sensing element configured to provide feedback from the heating block to the controller, wherein a first edge of the amplification and detection module is configured to be disposed adjacent to a matching, opposite second edge of the amplification and detection module such that a plurality of amplification and detection modules are disposed in a coplanar series when the first edge of the amplification and detection module is adjacent to the second edge of another amplification and detection module.

* * * * *